No. 719,554. PATENTED FEB. 3, 1903.
A. N. & E. J. BARNES.
APPARATUS FOR APPLYING ADHESIVES.
APPLICATION FILED MAR. 19, 1902.
NO MODEL.

WITNESSES:
B. G. LaBar,
D. G. Moran.

INVENTORS,
Alvin N. Barnes &
Ernest J. Barnes
BY D. B. Replogle
ATTORNEY

UNITED STATES PATENT OFFICE.

ALVIN N. BARNES AND ERNEST J. BARNES, OF SCRANTON, PENNSYLVANIA.

APPARATUS FOR APPLYING ADHESIVES.

SPECIFICATION forming part of Letters Patent No. 719,554, dated February 3, 1903.

Application filed March 19, 1902. Serial No. 99,023. (No model.)

*To all whom it may concern:*

Be it known that we, ALVIN N. BARNES and ERNEST J. BARNES, citizens of the United States, residing at Scranton, in the county of Lackawanna and State of Pennsylvania, have invented certain new and useful Improvements in Apparatus for Applying Adhesives and Similar Substances, of which the following is a specification, reference being had therein to the accompanying drawings.

This invention relates to apparatus for applying glue, paint, white lead, or other pasty or adhesive substances to the edges or parts of materials to be joined, such as flooring, parts of furniture, &c.; and the objects of the invention are to provide a rapid and economic device of the kind, to make such apparatus adjustable to different requirements, to facilitate the heating of the contents, and to render such apparatus more efficient than those heretofore in use.

To these ends the invention consists in the construction, arrangement, and combination of the several parts as are herein specified, and illustrated in the accompanying drawings, in which—

Figure 1:
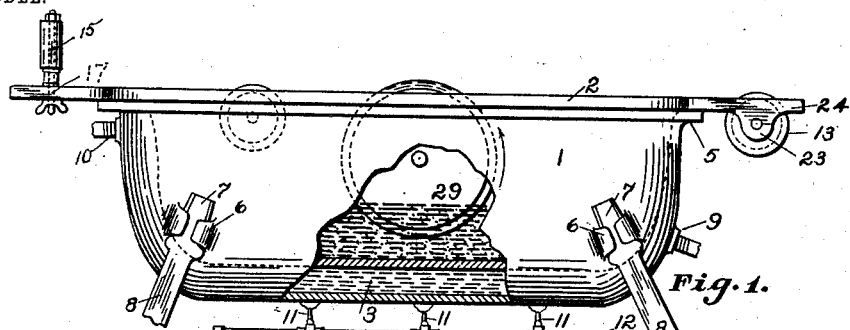
Figure 2:
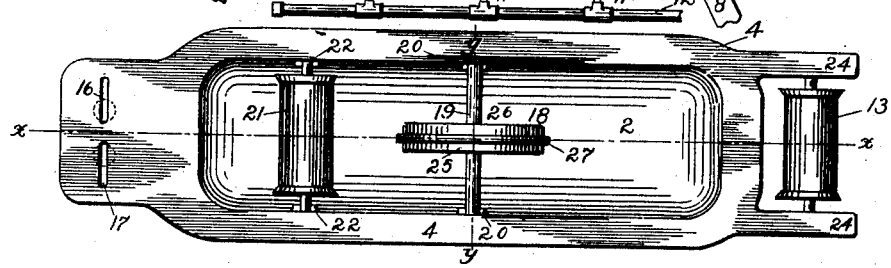
Figure 3:
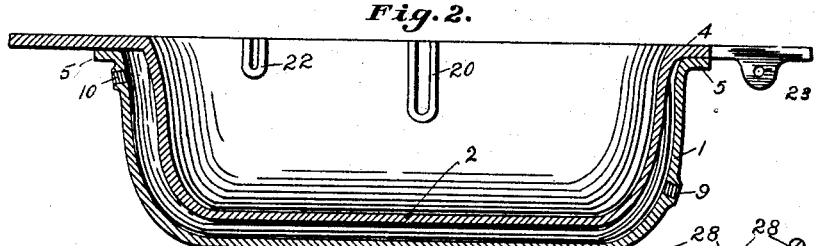
Figure 4:
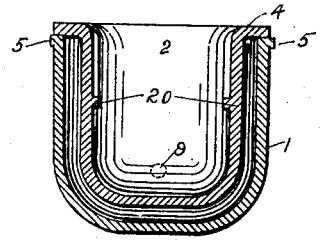
Figures 5, 6:
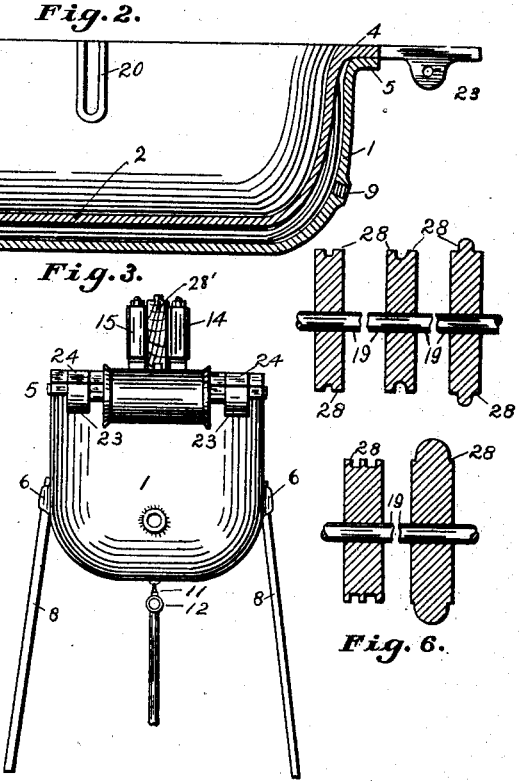

Figure 1 is a side elevation of an adhesive-applying apparatus constructed according to our invention, part of the side being broken away to more fully illustrate the relation of the interior parts. Fig. 2 is a top plan view of the apparatus. Fig. 3 is a cross-section taken on the line *x x* of Fig. 2, the interior rollers being removed. Fig. 4 is a similar cross-section taken on the line *y y* of Fig. 2. Fig. 5 is an end elevation of the apparatus complete. Fig. 6 is a view illustrating various forms of application-rollers which may be adopted and used in the apparatus.

Similar characters of reference denote like and corresponding parts throughout the several views.

Referring to the drawings, 1 designates an elongated hollow vessel, preferably made from cast-iron and adapted to be used as a kettle or bath to contain water or other liquid 3, filling the space between the exterior walls of the said kettle and an inner receptacle 2, which is adapted to contain the adhesive or other substance to be applied. The receptacle member 2 is provided with a top flange 4, extending around its sides and arranged to rest on the corresponding flange 5 of the vessel 1. The vessel 1 is provided at opposite sides with lugs 6, arranged to clasp the tapered ends 7 of removable legs 8, by which the apparatus is arranged to be supported. The vessel 1 is also provided with pipe-connection openings 9 and 10, the opening 10 being arranged to limit the height of water therein and the opening 9 being arranged to connect with steam-pipe connections, whereby the water within the space between the two vessels may be heated by steam, if found desirable. Our apparatus may be also suitably heated by gas-jets 11, leading from a suitable pipe 12, or any other method of heating the bath may of course be substituted. The receptacle 2 is provided at one end with a supporting-roller 13, arranged to support the weight of boards or other lumber passed over the apparatus. It is provided at the opposite end with a pair of rollers 14 and 15, arranged to revolve on vertical axes and shiftable in slots 16 and 17, whereby the width between the rollers aforesaid may be varied to suit the different thicknesses of lumber which they are arranged to guide. A take-up roller 18 is arranged at about the middle of the receptacle and is mounted on an axis 19, the respective ends of which rest in journal-supports 20, cast into the sides of the receptacle, with open sides upward to admit the journals. A roller 21 is also arranged in the end of the receptacle next to the guide-rollers 14 and 15, the object of said roller being to provide a rest for the edges of the lumber to which adhesive has already been applied and to assist in distributing the same. It is arranged within the receptacle in order that the drip, if any, gathering on its surface will fall into the receptacle whence it was taken by the take-up roller 18 aforesaid. The roller 21 is journaled to the walls of the receptacle 2 by journal-supports 22 22, having open sides upward to admit sliding in and out of the journals of said roller. The roller 13 is journaled to lugs 23 23 and is arranged between the projecting arms 24 24 of the receptacle 2. The rollers 13 and 21 and the take-up roller 18 are arranged so that their upper exposed convex surfaces are in line. In the take-up roller shown in Fig. 2 the surfaces 25 and 26 lie in a plane with the surfaces of the rollers 13 and 21, while the tongue 27, which is an annular projection on the said roller, is arranged to run within the groove of matched board for the purpose of thoroughly distributing the adhesive thereto. In the variations of the take-up roller shown in Fig. 6 the surfaces indicated as 28 are arranged to lie in the same plane with the surfaces of the rollers 21 and 13 aforesaid. It will be understood, of course, that when any of the forms shown in Fig. 6 are to be used the take-up roller 18 is to be removed and replaced by one of the other forms.

The further operation of the device is readily understood. The take-up roller 18 is arranged to revolve so that the lower portion of its periphery runs through the adhesive 29, whence it carries on its surface sufficient of the adhesive to apply it to the boards or other objects on which it is to be spread. The board to which the adhesive is to be applied is of course passed over the rollers resting on its edge, being guided in a straight line by the vertical rollers 14 and 15 and directed by them in such manner as to cause its grooved edge to match with the peripheral face of the take-up roller 18.

Having thus described our invention, we do not wish to be confined to the exact details as specified and shown, as many of them may be gradually varied without departing from the general spirit of the invention.

What we do claim, and desire to secure by Letters Patent, is—

In an adhesive-applying apparatus of the kind described, a trough-shaped receptacle having a flange adapting it to rest on and close the top of a similarly-shaped bath, journal-supports 20, 20 and 22, 22 cast in the side walls of said trough, an application-roller and a drip-roller mounted respectively on said supports, the said application-roller arranged to revolve through the contents of the trough, and the said drip-roller being less in diameter, and arranged to clear the contents of the said trough, a horizontal guide-roller 13 mounted on lugs on one end of said trough, a projection on the opposite end of said trough having transverse slots cut therethrough, and a pair of vertically-revolving guide-rollers secured to said projection by shanks extending through said slots, the said vertical rollers being adjustable by sliding in said slots, and having means for securing them into fixed positions therein, all arranged for joint operation, substantially as and for the purpose specified.

In testimony whereof we affix our signatures in presence of two witnesses.

ALVIN N. BARNES.
ERNEST J. BARNES.

Witnesses:
P. P. SMITH,
JOHN LUXENBURGER.